United States Patent
Kim

(10) Patent No.: US 11,252,877 B2
(45) Date of Patent: Feb. 22, 2022

(54) TROLLEY CONVEYOR

(71) Applicant: KOREA WHEEL CORPORATION, Ansan-si (KR)

(72) Inventor: Jeong Yun Kim, Bucheon-si Gyeonggi-do (KR)

(73) Assignee: KOREA WHEEL CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/105,487

(22) Filed: Nov. 25, 2020

(65) Prior Publication Data

US 2021/0130102 A1    May 6, 2021

Related U.S. Application Data

(63) Continuation-in-part of application No. PCT/KR2019/008581, filed on Jul. 11, 2019.

(30) Foreign Application Priority Data

Sep. 12, 2018  (KR) .......................... 10-2018-0109014
Jun. 7, 2019   (KR) .......................... 10-2019-0067522

(51) Int. Cl.
    *B65G 17/20*   (2006.01)
    *B65G 43/08*   (2006.01)
    (Continued)

(52) U.S. Cl.
    CPC ............ *A01G 9/26* (2013.01); *A01D 46/00* (2013.01); *A01G 5/00* (2013.01); *A01G 9/241* (2013.01);
    (Continued)

(58) Field of Classification Search
    None
    See application file for complete search history.

(56) References Cited

U.S. PATENT DOCUMENTS 3,074,356 A * 1/1963 Parker .................. B61B 10/022
                                                104/172.4
3,590,745 A    7/1971 Ouska
(Continued)

FOREIGN PATENT DOCUMENTS

GB      1076820 A        7/1967
KR    10-0490674         5/2005
(Continued)

OTHER PUBLICATIONS

International Search Report, PCT/KR2019/008581, dated Oct. 18, 2019 (4 pages).

*Primary Examiner* — Kavel Singh
(74) *Attorney, Agent, or Firm* — R. Reams Goodloe, Jr.

(57) ABSTRACT

A trolley conveyor. The trolley conveyor includes: a tubular rail track having a slotted opening at the top. A trolley chain installed to move in the rail track. A hanger is provided for suspending therebelow objects to be transported. The hanger includes a connector at the upper end thereof which extends downward to toward the center of the trolley chain. The trolley chain includes vertical and horizontal rollers in chain units, with vertical rollers in one chain unit and horizontal rollers in an adjacent chain unit. The chain units are pivotally connected for up and down and side to side motion within the track. While the trolley chain moves, the connector avoids contact with the ends of the slot in the track. Thus, the trolley conveyor prevents the generation of noise and foreign substances. Also, the trolley conveyor prevents transfer of dirt, oil, and debris to an object being transported.

10 Claims, 5 Drawing Sheets

(51) Int. Cl.
*B65G 35/06* (2006.01)
*B65G 39/20* (2006.01)
*A01G 9/26* (2006.01)
*A01D 46/00* (2006.01)
*A01G 5/00* (2006.01)
*A01G 9/24* (2006.01)
*E04B 7/16* (2006.01)

(52) U.S. Cl.
CPC ............ *A01G 9/247* (2013.01); *B65G 17/20* (2013.01); *B65G 35/06* (2013.01); *B65G 39/20* (2013.01); *B65G 43/08* (2013.01); *E04B 7/16* (2013.01); *B65G 2203/0266* (2013.01)

(56) References Cited

U.S. PATENT DOCUMENTS

| | | | |
|---|---|---|---|
| 3,762,535 A | 10/1973 | Becker et al. | |
| 4,598,812 A * | 7/1986 | Grube | B65G 17/002 104/89 |
| 6,125,991 A | 10/2000 | Veldkamp et al. | |
| 6,386,355 B1 | 5/2002 | Willems | |
| 6,910,425 B2 * | 6/2005 | Galpin | B61C 13/04 104/139 |
| 2004/0084288 A1 | 5/2004 | Ashida et al. | |
| 2013/0284569 A1 | 10/2013 | Studer | |
| 2021/0127596 A1 | 5/2021 | Kim | |
| 2021/0127597 A1 | 5/2021 | Choe | |
| 2021/0147154 A1 | 5/2021 | Choe | |

FOREIGN PATENT DOCUMENTS

| | | |
|---|---|---|
| KR | 10-2009-0088668 | 8/2009 |
| KR | 10-1150368 | 6/2012 |
| KR | 10-2012-0094769 | 8/2012 |
| KR | 10-2012-0094769 A | 8/2012 |
| KR | 10-2012-0125064 | 11/2012 |
| KR | 10-2012-0125064 A | 11/2012 |
| KR | 10-1292779 B1 | 8/2013 |
| KR | 10-2017-0025460 | 3/2017 |
| KR | 10-2018-0020542 | 2/2018 |
| KR | 10-2018-0020542 A | 2/2018 |
| KR | 10-2074300 | 3/2020 |
| KR | 10-2074300 B1 | 3/2020 |
| WO | WO2020/054958 A1 | 3/2020 |
| WO | WO 2020/054958 A1 | 3/2020 |

* cited by examiner

TROLLEY CONVEYOR

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

RELATED PATENT APPLICATIONS

This application is a continuation-in-part of PCT KR 2019/008581, filed on Jul. 11, 2019, and published as WIPO Publication No. WO 2020/054958 A1 on Mar. 19, 2020, entitled Trolley Conveyor and Plant Cultivation System Using Same. That PCT application claimed priority from Korean Patent Application 10-2018-0109014, filed Sep. 12, 2018, and Korean Patent Application 10-2019-0067522, filed Jun. 7, 2019. The disclosures of each of PCT KR 2019/008581, Korean Patent Application 10-2018-0109014, and Korean Patent Application 10-2019-0067522, are incorporated herein in their entirety by this reference.

TECHNICAL FIELD

This disclosure describes a trolley conveyor, and more particularly, is directed to trolley conveyor having an improved structure which minimizes or eliminates contaminating objects being conveyed with lubricants or foreign debris.

BACKGROUND

In general, trolley conveyors are well known, and are often used to hang and transport objects on a moveable continuous support chain within a mounting track, for sequential operations, such as plating or powder coating of small parts, processing leather products, or animal slaughterhouse operations. Such prior art trolley conveyors are equipped with hangers on a trolley chain that moves along a rail track installed on a ceiling or a post. Unfortunately, metal flakes or metal powder generated by friction during movement of the trolley chain is often generated, and such foreign material may fall and contaminate the object being transported.

An example of a prior art trolley conveyor having structure which produces contamination such as metal flakes or powder is disclosed in Korean Patent No. 10-1150368, registered on May 21, 2012. Some aspects of that prior art design for a trolley conveyor as described therein are depicted in FIG. 1 herein. That trolley track design uses a tubular pipe 1 for a track 2. The tubular pipe 1 has an obliquely located longitudinally extending slot therein defined by slot edge walls 6. Unfortunately, in that prior art trolley conveyor, the hanger 7 may sway back and forth when loaded, causing the chain portion 4 to turn within the tubular pipe 1, and thus the connector 5 used to join the hanger 7 and the chain portion 4 becomes further eccentric with respect to the tubular pipe 1, as even the upper and lower ends of vertical roller 3 sway from side to side. When that happens, a hanger 7 used with that prior art tubular pipe design can roll (see reference line R in FIG. 1) and become displaced somewhat circumferentially, as indicated by the double-dashed lines DR (displacement to the right) and DL (displacement to the left) in FIG. 1. As a result, the connector 5 and in extreme cases also the trolley chain itself, may scrape or bind together with the slot 6 in the tubular pipe 1, thus producing undesirable friction, noise, and metal debris. Since the hanger 7 continues to move while in contact with the slot or edge 6 of the opening in the tubular pipe 1. Consequently, there remains a need for an improved trolley conveyor design which avoids such problems.

Some Objects, Advantages, and Novel Features

An object of the invention(s) disclosed herein is to solve the above-described problem of off-center loading of a trolley conveyor, and thus avoid creating noise.

An object of the invention(s) disclosed herein is to solve the above-described problem of contamination of objects being carried by a trolley conveyor, by eliminating generation of metal debris due to off-center loading of a trolley conveyor.

Another object of the invention(s) disclosed herein is to provide a trolley conveyor system which is simple to manufacture and reliably operate, by avoiding shutdowns resulting from abrasive and erosive interaction of a stationary track and components of a moving chain portion of a trolley conveyor.

Thus, another object of the invention(s) disclosed herein is to provide a trolley conveyor capable of efficient transport of objects, while minimizing noise generation and minimizing production of foreign matter such as dust and dirt.

The above objects and various advantages of the invention(s) as disclosed herein will become more apparent from the description provided and details of various embodiments, as will be understood by those skilled in the art.

SUMMARY

An improved trolley conveyor design has been developed and is described herein. A stationary tubular rail track is provided. In an embodiment, the tubular rail track is provided in the form of a square tubular member with an open slot at the top. The stationary tubular track has a bottom wall, inner sidewalls, and a slotted upper wall defining an open slot between upper end walls. A trolley chain is installed inside the stationary tubular rail track for movement with respect to the stationary tubular rail track. The trolley chain is provided using endlessly joined chain portions, wherein each chain portion includes a first chain unit and a second chain unit. The first chain unit further includes a pair of first chain links and a pair of vertical rollers rotatably affixed to the pair of first chain links for rotation over the bottom wall of the stationary tubular track. The second chain unit includes a pair of second chain links and at least one horizontal roller rotatably affixed to the pair of second chain links for rotation against at least one of the inner sidewalls of the stationary tubular track. The first chain unit and the second chain unit are pivotally attached each to the other at an intermediate pivot block to form a first chain portion. Sequential chain portions are pivotally attached each to the other with end pivot blocks. A neck is provided for attachment of hangers. The neck extends upward from the trolley chain, further between and beyond the upper end walls in the slotted upper wall of the stationary tubular track, and outward through the slotted upper wall, ultimately terminating in one or more hanger attachment flanges. Hangers are provided. The hangers have an upper end with downwardly extending connectors configured for attaching the hangers to the one or more attachment flanges. The hanger has a lower end configured to hang transported material therefrom. A hanger body extends between the neck and the lower end. The trolley conveyor design provides for containment of lubricating fluids, to avoid discharge of the same from the trolley conveyor. Importantly, since a balanced load configuration results from the design of the necks and hangers, eccentric operation of the trolley chain in the stationary track is effectively eliminated, thus avoiding contamination of objects being transported with foreign objects such as metal debris.

BRIEF DESCRIPTION OF THE DRAWING

The present invention(s) are described herein by way of exemplary embodiments, using for illustration the accompanying drawing in which like reference numerals denote like elements in the various figures of the drawing, and in which.

Figure 1:
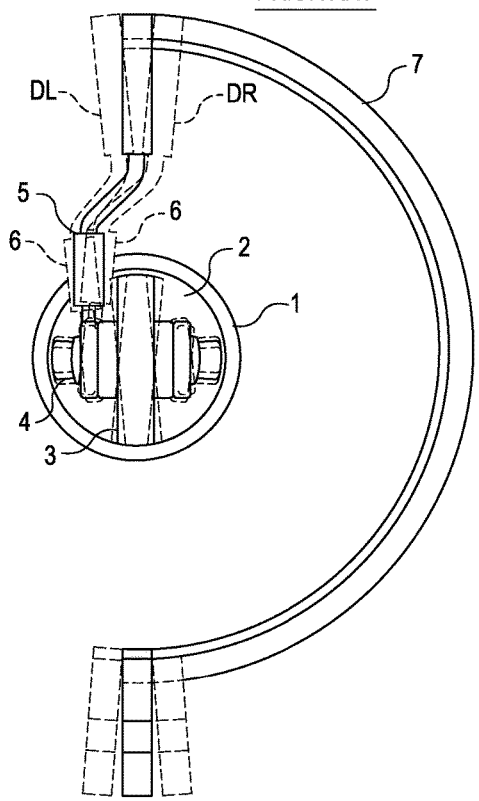
FIG. 1 is a vertical cross-sectional view of a prior art trolley conveyor design, showing how structure used to attach a hanger to a moving chain member may move back and forth, as indicted by the two ended curved reference arrow R, and thus cause a connector between a hanger and a chain portion to bind with edges of a longitudinally extending slot in the stationary track, thus generating noise and debris.

The foregoing figures, being merely exemplary, contain various elements that may be present or omitted from a particular final configuration for an embodiment of a trolley system. Other variations in trolley system components may include other mechanical structures, mechanical arrangements, or size and shape of components, and yet employ the principles described herein and as generally depicted in the drawing figures provided, and as more specifically called out in the claims set forth below. Detailed descriptions of configurations and functions of devices known by those of skill in the art are unnecessary, and have thus been omitted. However, there is no intention to limit the claimed invention to dimensional data, and any suggestion provided by any of the drawing figures of this specification are exemplary rather than mandatory. Thus, the chain assembly and related components for links in a trolley conveyor may be provided which is sized up or down from any dimensions depicted, without affecting the scope of the appended claims. An attempt has been made to draw the figures in a way that illustrates at least those elements that are significant for an understanding of exemplary trolley system, and particulars may be varied for specific situations.

It should be understood that various features may be utilized in accord with the teachings hereof, as may be useful in different embodiments, depending upon the specific requirements such as spacing between stationary track members of runs of a trolley conveyor system, all within the scope and coverage of the teachings herein as defined by the claims. Further, like features in various embodiments for a trolley conveyor system may be described using like reference numerals, or other like references, without further mention thereof.

DETAILED DESCRIPTION

Figure 2:
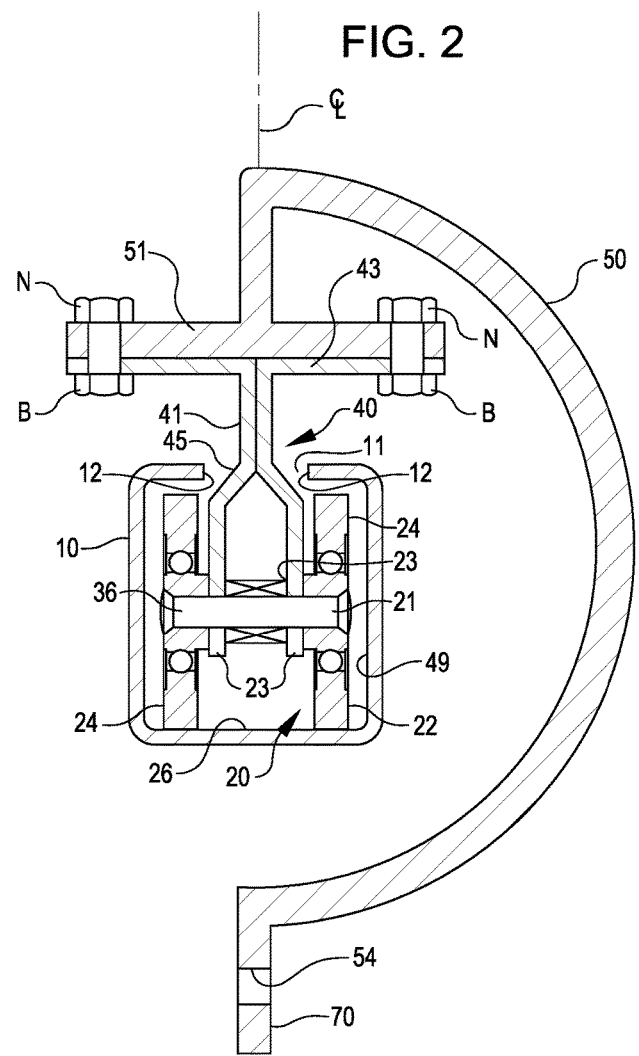
FIG. 2 is a vertical cross-sectional view of components of an improved design for a trolley conveyor system, and in particular, for the design of components for attachment of a hanger to the moving chain portions of the trolley conveyor.

Attention is directed to FIG. 2, where an exemplary design for a trolley conveyor 200 is provided. The trolley conveyor 200 includes a tubular rail track 10, a trolley chain 20 installed to move within the rail track 10. The tubular rail track 10 may be formed in a tubular shape having an angular pipe shape, such as a square tubular shape. An opening 11 is formed on the upper surface of track 10 by opposing sidewalls 12. The opening 11 extends along the longitudinal direction of the rail track 10.

As seen in FIG. 2, a central axis 21 is provided for vertically oriented rollers 22 of the trolley chain 20. A connector 40 is provided between the trolley chain 20 and a hanger 50. The connector 40 may be connected to the trolley chain 20 at a lower end 23. A generally semi-circular hanger 50 may be coupled to the upper end 43 of the connector 40.

In the trolley conveyor 200, a neck 41 of the connector 40 connects the trolley chain 20 to hanger 50. In an embodiment, upwardly extending portions 45 of neck 41 may approach, or penetrate, the slot opening 11 formed on the upper surface of track 10. A pair of extending portions 45 may be bent obliquely toward each other and then contacted, so that the bottom portion 23 of the connector 40 is in contact with the trolley chain 20. In this manner, clearance is always provided within slot opening 11, with the effect that noise and foreign matters are prevented from being generated. Thus, contamination of the transported material, by foreign matters generated from the trolley conveyor 200, is avoided.

Figure 3:
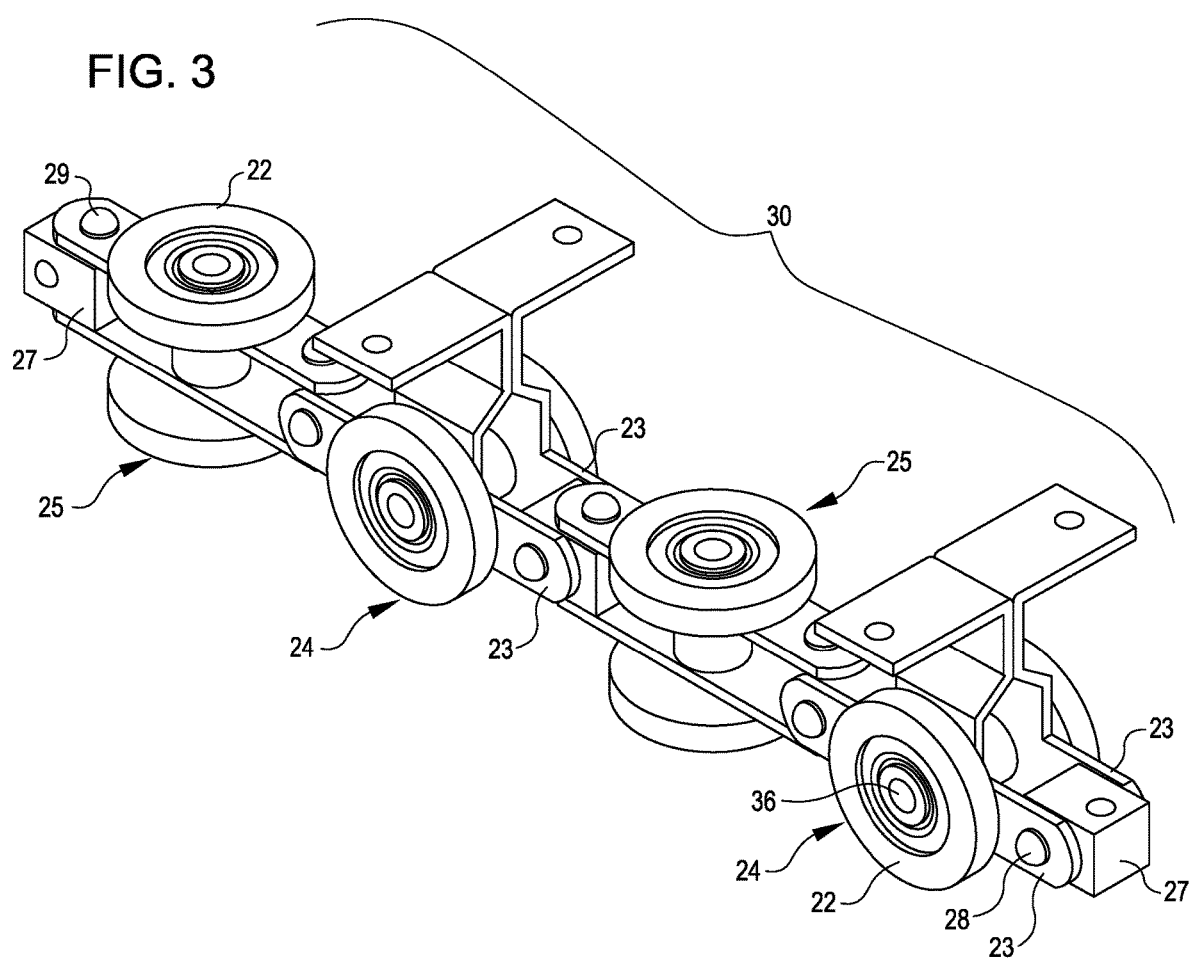
FIG. 3 is a perspective view, showing an embodiment for a repeating section or chain portion for a trolley conveyor suitable for movement on a stationary track (not shown), showing a first chain unit with vertical wheels and a second chain unit with horizontal wheels, joined together at an intermediate pivot block, and also showing end pivot blocks used for joining a first chain portion with a subsequent chain portion to form an endless chain.
Figure 4:
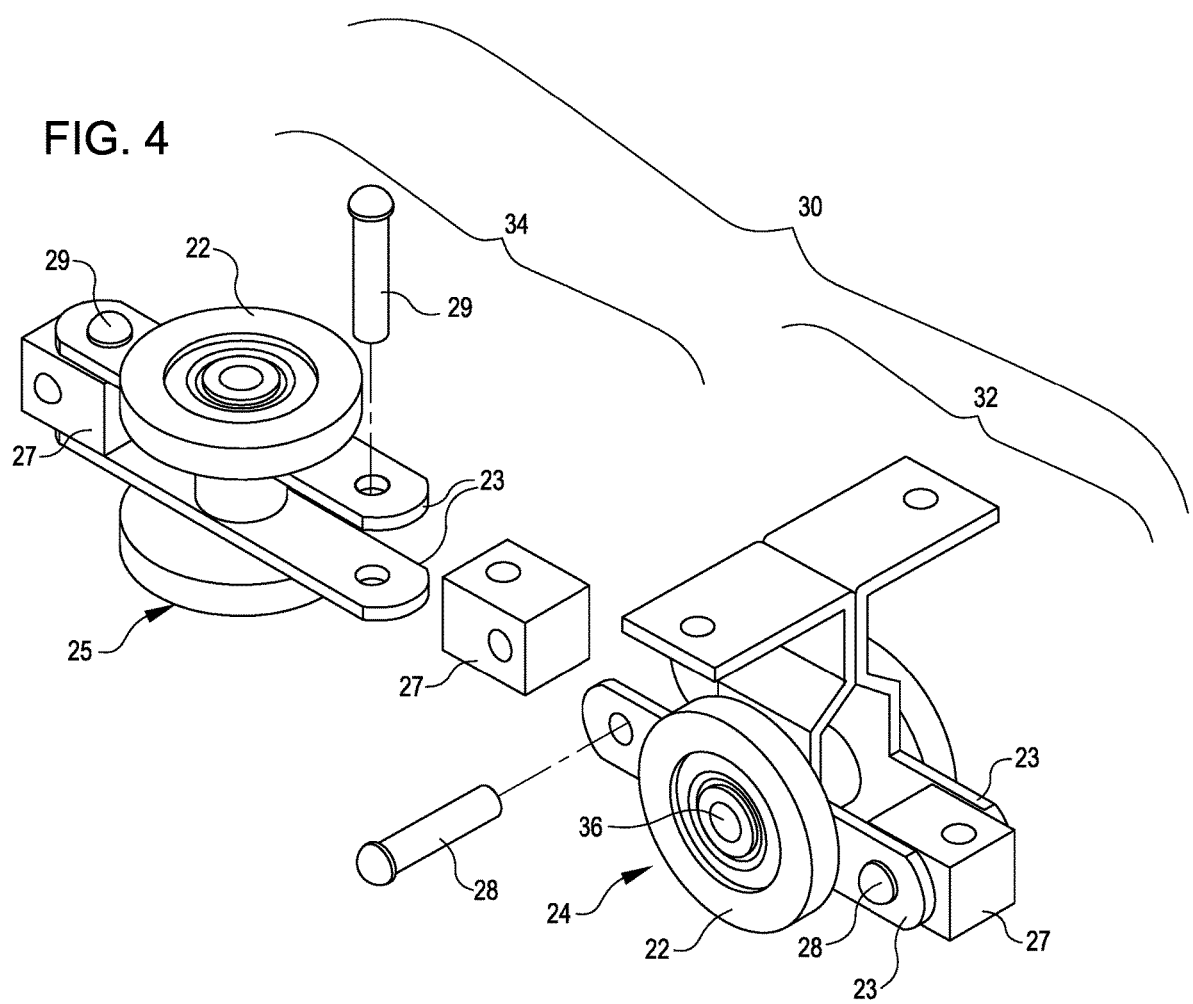
FIG. 4 is a partially disassembled perspective view, and showing the components involved in combining a first chain unit with vertical wheels and a second chain unit with horizontal wheels, joined together at an intermediate pivot block, and also showing end pivot blocks used for joining a first chain portion with a subsequent chain portion to form an endless chain.

The trolley chain 20 is arranged to move longitudinally in the rail track 10, and may ride along on a vertically rotatable oriented pair of rollers 22 on both sides of the two spaced apart support members 23, as better seen in FIGS. 3 and 4. Also as shown in FIGS. 3 and 4, in an embodiment a plurality of vertical rollers 24 are provided to support the vertical load, by being vertically arranged to be in contact with the inner bottom surface 26 of the rail track 10. In an embodiment, as shown in FIGS. 3 and 4, a pair of horizontal rollers 25 is provided, and the horizontal rollers are in contact with one side or the other of the inner side walls of track 10. The horizontal rollers 25 are provided to support the chain portion 20 against the inner sidewalls 49 of the track 10, to resist against force in the lateral direction.

Figure 5:
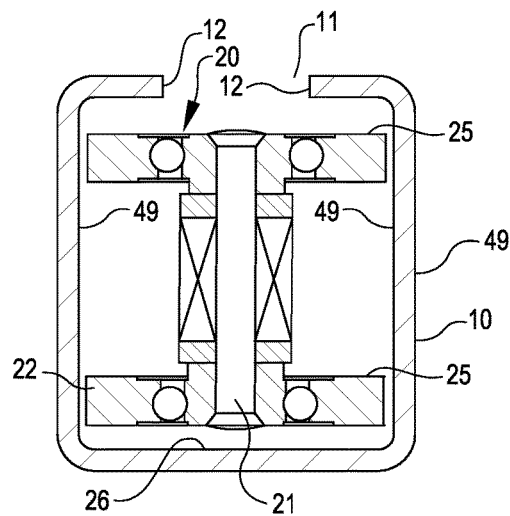
FIG. 5 is a vertical cross-sectional view of components of an improved design for a trolley conveyor system, and in particular, for the design of components of a second chain unit of the type wherein two horizontal wheels are used to prevent friction of the chain portion against inner sidewalls of a stationary tubular track.
Figure 7:
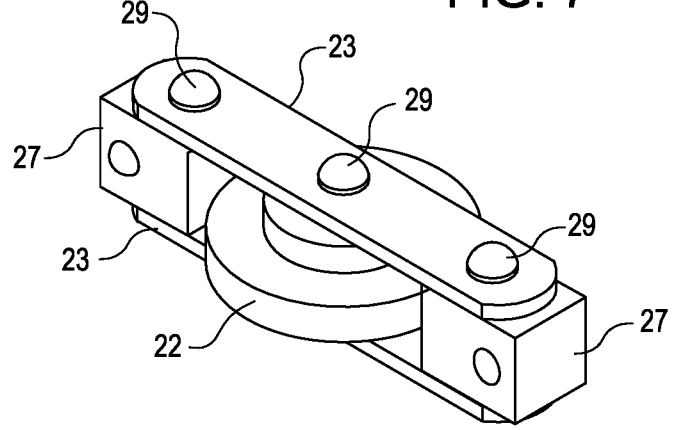
FIG. 7 is a perspective view, and showing the components for a second chain unit using a single horizontal wheel to minimize or prevent friction against interior sidewalls of a stationary tubular track.

The vertical rollers 24 and the horizontal rollers 25 are hinged to each other in a chain portion 30 structure which includes a first chain unit 32 and a second chain unit 34, which are sequentially arranged n repeating fashion, wherein first chain unit 32 and second chain unit 34 are alternately arranged in an endless chain forming trolley chain 20. As seen in FIGS. 2 and 4, the vertical roller 24 is disposed on the inner floor 26 of the rail track 10. It is shown in cross-sectional view in FIG. 2. In FIG. 5, a pair of horizontal rollers 25 is shown arranged for contact with either inner side 49 of track 10. Similarly, in FIG. 8, the use of a single horizontal roller 22 is shown, arranged for contact with either inner side 49 of track 10. The single horizontal roller 22 configuration for a second chain unit 34 is depicted in FIG. 7.

As seen in FIG. 2, at both ends of the support members 23 of the vertical roller 24, a connection block 27 is rotatably connected between the support members 23 by a hinge pin 28, and the adjacent horizontal rollers 25 are supported. The end of the member 23 is horizontally connected to the connection block 27 by a hinge pin 29 so that the vertical rollers and the horizontal rollers of the trolley chain 20 are rotatably connected with respect to each other, so that the trolley chain may move around curves in track 10. With this design, both vertical and horizontal loads are supported by the inner bottom 26 of track 10, and/or by the inner sidewalls 49 of rail track 10.

As can be seen in FIG. 2 a rotation shaft 36 on which a pair of vertical rollers 24 are mounted are located to be supported by spaced apart support members 23, yet provide clearance from inner sidewalls 49.

In an embodiment, connectors 40 may be integrally formed with each of the support members 23 which also support the vertical roller 24, but further include post 41 protruding upward and extending through the opening 11, between edge walls 12. Mounting flanges 43 may be provided in the form of horizontal plates extending outward from mounting post 41. The flanges 43 are coupled with a horizontal connection plate 51 formed at an upper end of the hanger 50. Flanges 43 and connection plate 51 may be joined by suitable fasteners such as nuts N and bolts B.

The hanger 50 may formed by being curved in a generally C shape, or in an embodiment, a semicircular shape, while still protruding upward from the upper surface of along a centerline CL of horizontal connection post 51. At the lower end of hanger 50, a selected connection system may be installed, such as use of a vertical flange 70 with hole 54 formed therein. Although the hanger 50 is eccentric with respect to the rail track 10, the connecting portion, as provided extending from the upper surface of the support member 23, while spaced apart from each other while spaced within the narrow width of the opening 11, still maintains clearance during movement of trolley chain 20.

Any foreign substances that may be generated between the roller and the rail track 10 while the trolley chain 20 is moved on the square pipe-shaped rail track 10 are accumulated on the inner floor of the rail track. The connector post 41 with the hanger 50 provided on the trolley chain 20 does not come into contact with the edges 12 of the opening 11.

Figure 6:
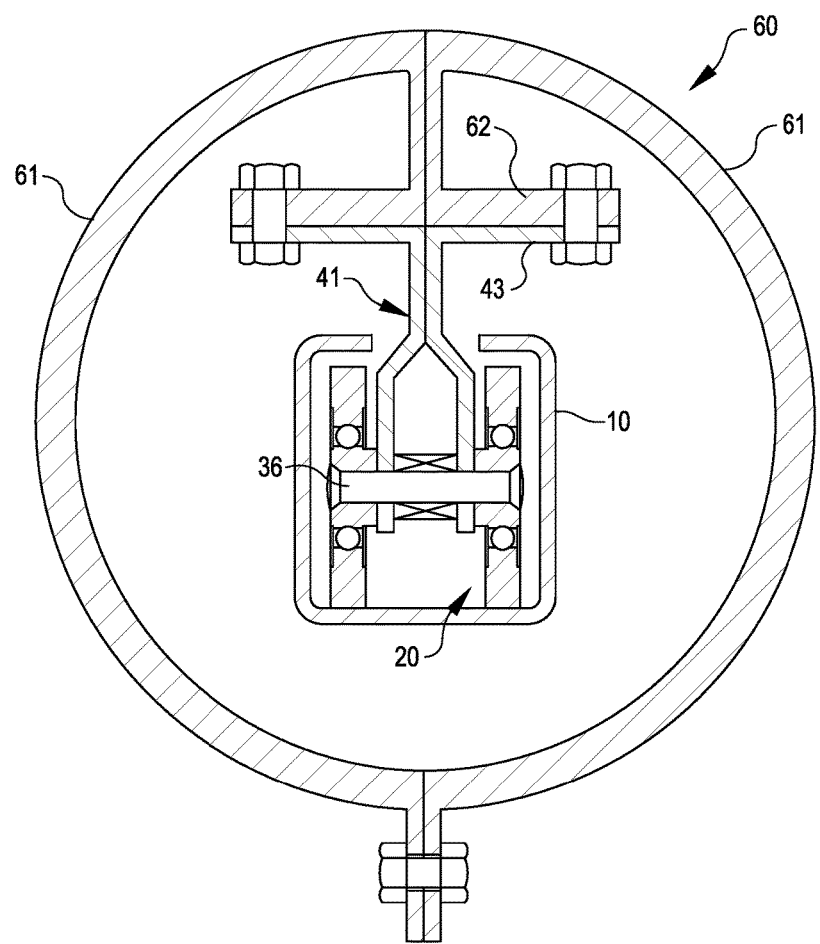
FIG. 6 is a vertical cross-sectional view of components of an improved design for a trolley conveyor system, and in particular, for the design of components of a first chain unit of the type wherein two vertical wheels are used to prevent friction of the chain portion against the bottom wall of a stationary tubular track.

In FIG. 6, in the trolley conveyor of FIG. 2, another embodiment is provided, showing the use of a hanger 60 in back to back semicircular components 61. When a transported object is suspended at the bottom of the hanger 61, the load is centered in the track 10. Such an arrangement may be useful for carriage of heavy loads. The hangar 60 is composed of two semi-circular hanger members 61, each of the hanger members are extended downward from the top and then bent outward to form a flange 62. The flange 62 is bolted to the flange 43 at the upper end of the connector post 41 of the trolley chain 20. By fastening and coupling, since the hanger members 61 are arranged symmetrically from the outside with respect to the rail track 10, no torsion of the rail track 10 is generated due to eccentric load, as was the case for a prior art design discussed in connection with FIG. 1 above. With the design shown in FIG. 6, there is no problem of deformation at all.

Figure 8:
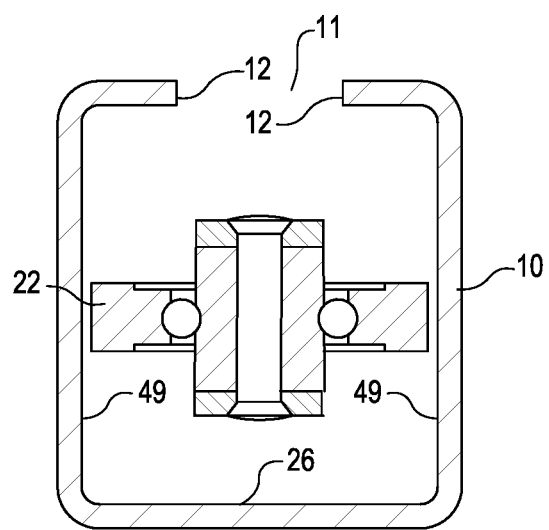
FIG. 8 is a cross-section view, showing the components for a second chain unit using a single horizontal wheel to minimize or prevent friction against interior sidewalls of a stationary tubular track, using the structure just revealed in FIG. 7 above.

In the embodiments shown in FIG. 3, the horizontal roller 25 is composed of a pair of rollers 22. However, only one horizontal roller 25 is provided in the configuration illustrated in FIG. 7. As seen in FIG. 4, the second chain unit 34 is arranged to be horizontally rotatable about the hinge pin 29 between the support members 23, spaced apart from each other up and down, and at both ends of the support members 23, and the connection blocks 27. Likewise, blocks 27 maybe arranged between vertically oriented support members 23, for vertically rotatable motion. In FIG. 8, one roller 22 disposed horizontally is provided in each of the second chain units on the trolley chain 20 inside of rail track 10.

A novel trolley conveyor has been fully described herein. The trolley conveyor has a stationary tubular rail track. The stationary tubular track has a bottom wall, inner sidewalls, and a slotted upper wall defining an open slot between upper end walls. A trolley chain is provided for movement with respect to the stationary tubular rail track. The trolley chain is made up of a set of endlessly joined chain portions. Each chain portion includes a first chain unit and a second chain unit. The first chain unit further comprising a pair of first chain links and a pair of vertical rollers rotatably affixed to the pair of first chain links, and disposed for rotation on the bottom wall of the stationary tubular track. The second chain unit is provided by a pair of second chain links and one or more horizontal rollers rotatably affixed to the pair of second chain links, for rotation against at least one of the inner sidewalls of the stationary tubular track. In an embodiment, a single horizontal roller may be provided. In an embodiment, a pair of horizontal rollers is provided. The first chain unit and the second chain unit are pivotally attached each to the other at an intermediate pivot block Sequential chain portions are pivotally attached each to the other with end pivot blocks. A neck or connector extends upward from the trolley chain, between and beyond the upper end walls in the slotted upper wall of the stationary tubular track and outward through the slotted upper wall, and terminating in one or more attachment flanges Hangers are provided. The hangers have an upper end, the upper end includes a downwardly extending connector configured for attaching the hangers to one or more attachment flanges. The lower end of the hangers is for attachment to or hanging from a selected material for transport. A hanger body extends between the neck and the lower end. In an embodiment, the hanger body may be provided in a C shaped configuration.

In an embodiment, the intermediate pivot block includes a vertical aperture defined by vertical sidewalls, and an intermediate vertical pivot pin is provided. The intermediate vertical pivot pin joins the intermediate pivot block to the second chain unit, so as to allow horizontal movement between the first chain unit and the second chain unit.

In an embodiment, the intermediate pivot block includes a horizontal aperture defined by horizontal sidewalls, and wherein the intermediate pivot block includes an intermediate horizontal pivot pin. The intermediate horizontal pivot pin joins the intermediate pivot block to the first chain unit, so as to allow vertical movement between the first chain unit and the second chain unit.

In an embodiment, an end pivot block is provided, the end pivot block includes a vertical aperture defined by vertical sidewalls. An end vertical pivot pin is provided. The end vertical pivot pin joins the intermediate pivot block to the second chain unit, so as to allow horizontal movement between a first chain portion (including a first chain unit and a second chain unit), and a second chain portion (also including a first chain unit and a second chain unit).

In an embodiment, the end pivot block includes a horizontal aperture defined by horizontal sidewalls. An end horizontal pivot pin is also provided. The end horizontal pivot pin joins the end pivot block to the first chain portion to the second chain portion, so as to allow vertical movement between the first chain portion and the second chain portion.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the trolley conveyor system details as described herein, may be modified from those embodiments provided herein, without materially departing from the novel teachings and advantages provided.

The aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A trolley conveyor, comprising:
a stationary tubular rail track, the stationary tubular track having a bottom wall, inner sidewalls, and a slotted upper wall defining an open slot between upper end walls;

a trolley chain, the trolley chain installed inside the stationary tubular rail track for movement with respect to the stationary tubular rail track, the trolley chain comprising endlessly joined chain portions, each chain portion comprising a first chain unit and a second chain unit, the first chain unit further comprising a pair of first chain links and a pair of vertical rollers rotatably affixed to the pair of first chain links for rotation on the bottom wall of the stationary tubular track, and the second chain unit comprising a pair of second chain links and a pair of horizontal rollers rotatably affixed to the pair of second chain links for rotation against at least one of the inner sidewalls of the stationary tubular track, wherein the first chain unit and the second chain unit are pivotally attached each to the other at an intermediate pivot block, and wherein sequential chain portions are pivotally attached each to the other with end pivot blocks, and a neck extending upward from the trolley chain and extending between and beyond the upper end walls in the slotted upper wall of the stationary tubular track and outward through the slotted upper wall and terminating in one or more attachment flanges;

hangers, the hangers comprising an upper end, the upper end comprising downwardly extending connectors configured for attaching the hangers to the one or more attachment flanges, a lower end configured to hang transported material therefrom, and a hanger body extending between the neck and the lower end.

2. The trolley conveyor as set forth in claim 1, wherein the intermediate pivot block includes a vertical aperture defined by vertical sidewalls, and wherein the intermediate pivot block includes an intermediate vertical pivot pin, the intermediate vertical pivot pin joining the intermediate pivot block to the second chain unit, so as to allow horizontal movement between the first chain unit and the second chain unit.

3. The trolley conveyor as set forth in claim 2, wherein the intermediate pivot block includes a horizontal aperture defined by horizontal sidewalls, and wherein the intermediate pivot block includes an intermediate horizontal pivot pin, the intermediate horizontal pivot pin joining the intermediate pivot block to the first chain unit, so as to allow vertical movement between the first chain unit and the second chain unit.

4. The trolley conveyor as set forth in claim 1, wherein the end pivot block includes a vertical aperture defined by vertical sidewalls, and wherein the end pivot block includes an end vertical pivot pin, the end vertical pivot pin joining the intermediate pivot block to the second chain unit, so as to allow horizontal movement between a first chain portion including a first chain unit and a second chain unit, and a second chain portion including a first chain unit and a second chain unit.

5. The trolley conveyor as set forth in claim 4, wherein the end pivot block includes a horizontal aperture defined by horizontal sidewalls, and wherein the end pivot block includes an end horizontal pivot pin, the end horizontal pivot pin joining the end pivot block to the first chain portion to the second chain portion, so as to allow vertical movement between the first chain portion and the second chain portion.

6. A trolley conveyor, comprising:
a stationary tubular rail track, the stationary tubular track having a bottom wall, inner sidewalls, and a slotted upper wall defining an open slot between upper end walls;

a trolley chain, the trolley chain installed inside the stationary tubular rail track for movement with respect to the stationary tubular rail track, the trolley chain comprising endlessly joined chain portions, each chain portion comprising a first chain unit and a second chain unit, the first chain unit further comprising a pair of first chain links and a single vertical roller rotatably affixed to the pair of first chain links for rotation on the bottom wall of the stationary tubular track, and the second chain unit comprising a pair of second chain links and a pair of horizontal rollers rotatably affixed to the pair of second chain links for rotation against at least one of the inner sidewalls of the stationary tubular track, wherein the first chain unit and the second chain unit are pivotally attached each to the other at an intermediate pivot block, and wherein sequential chain portions are pivotally attached each to the other with end pivot blocks, and a neck extending upward from the trolley chain and extending between and beyond the upper end walls in the slotted upper wall of the stationary tubular track and outward through the slotted upper wall and terminating in one or more attachment flanges;

hangers, the hangers comprising an upper end, the upper end comprising downwardly extending connectors configured for attaching the hangers to the one or more attachment flanges, a lower end configured to hang transported material therefrom, and a hanger body extending between the neck and the lower end.

7. The trolley conveyor as set forth in claim 6, wherein the intermediate pivot block includes a vertical aperture defined by vertical sidewalls, and wherein the intermediate pivot block includes a vertical pivot pin, the vertical pivot pin joining the intermediate pivot block to the second chain unit, so as to allow horizontal movement between the first chain unit and the second chain unit.

8. The trolley conveyor as set forth in claim 6, wherein the intermediate pivot block includes a horizontal aperture defined by horizontal sidewalls, and wherein the intermediate pivot block includes a horizontal pivot pin, the horizontal pivot pin joining the intermediate pivot block to the first chain unit, so as to allow vertical movement between the first chain unit and the second chain unit.

9. The trolley conveyor as set forth in claim 6, wherein the end pivot block includes a vertical aperture defined by vertical sidewalls, and wherein the end pivot block includes an end vertical pivot pin, the end vertical pivot pin joining the intermediate pivot block to the second chain unit, so as to allow horizontal movement between a first chain portion including a first chain unit and a second chain unit, and a second chain portion including a first chain unit and a second chain unit.

10. The trolley conveyor as set forth in claim 9, wherein the end pivot block includes a horizontal aperture defined by horizontal sidewalls, and wherein the end pivot block includes an end horizontal pivot pin, the end horizontal pivot pin joining the end pivot block to the first chain portion to the second chain portion, so as to allow vertical movement between the first chain portion and the second chain portion.

* * * * *